US012806584B2

(12) United States Patent
Robert et al.

(10) Patent No.: US 12,806,584 B2
(45) Date of Patent: Nov. 24, 2026

(54) METHOD FOR DISPERSING AND MILLING PARTICLES IN A FLUID

(71) Applicant: BASF Coatings GmbH, Münster (DE)

(72) Inventors: Fabien Robert, Clermont de l'Oise Cedex (FR); Bernard Benoist, Clermont de l'Oise Cedex (FR); Stephane Paven, Clermont de l'Oise Cedex (FR)

(73) Assignee: BASF COATINGS GMBH, Muenster (DE)

( * ) Notice: Subject to any disclaimer, the term of this patent is extended or adjusted under 35 U.S.C. 154(b) by 947 days.

(21) Appl. No.: 17/635,436

(22) PCT Filed: Aug. 12, 2020

(86) PCT No.: PCT/EP2020/072568
§ 371 (c)(1),
(2) Date: Feb. 15, 2022

(87) PCT Pub. No.: WO2021/032551
PCT Pub. Date: Feb. 25, 2021

(65) Prior Publication Data

US 2022/0362726 A1 Nov. 17, 2022

(30) Foreign Application Priority Data

Aug. 22, 2019 (EP) .................................... 19306027

(51) Int. Cl.
*B01F 25/52* (2022.01)
*B01F 23/53* (2022.01)
(Continued)

(52) U.S. Cl.
CPC .............. *B01F 25/52* (2022.01); *B01F 23/53* (2022.01); *B01F 27/91* (2022.01); *B01F 35/2211* (2022.01); *B01F 2101/30* (2022.01)

(58) Field of Classification Search
CPC ................................ B01F 23/53; B01F 25/52
See application file for complete search history.

(56) References Cited

U.S. PATENT DOCUMENTS 1,781,435 A 11/1930 Carper
7,637,651 B2 * 12/2009 Bush ....................... B01F 27/27
366/136

(Continued)

FOREIGN PATENT DOCUMENTS

CN 103360185 A 10/2013
CN 206577642 U 10/2017

(Continued)

OTHER PUBLICATIONS

Liu, M. (2016). Mean Age Theory for Quantitative Mixing Analysis, In S. Kresta, A. Etchells, D. Dickey & V. Atiemo-Obeng (Eds.), Advances in Industrial Mixing—A Companion to the Handbook of Industrial Mixing (pp. 15-41). John Wiley & Sons. (Year: 2016).*

(Continued)

*Primary Examiner* — Claire X Wang
*Assistant Examiner* — Patrick M Mccarty
(74) *Attorney, Agent, or Firm* — Armstrong Teasdale LLP

(57) ABSTRACT

The invention refers to a method and a system for dispersing particles in a fluid. The method comprises stirring a fluid 160 comprising particles 164 in a stirring container 110 using stirring means 120. During stirring the fluid is recirculated by continuously retrieving an amount of fluid from a retrieving position 131. Further, the particles are milled, wherein during each pass through the milling means 140 a size of particles in the retrieved fluid is reduced. The retrieved fluid having passed through the milling means is continuously reintroduced into the stirring container at a reintroduction position 151. The reintroduced fluid is mixed with the fluid in the stirring container in a mixing region 161 defined by the stirring means, and the retrieving position is determined (Continued)

such that the retrieved fluid comprises particles with an average particle size differing from the average particle size of particles in the mixing region.

11 Claims, 4 Drawing Sheets

(51) Int. Cl.

| | |
|---|---|
| ***B01F 27/91*** | (2022.01) |
| ***B01F 35/221*** | (2022.01) |
| *B01F 101/30* | (2022.01) |

(56) References Cited

U.S. PATENT DOCUMENTS

| | | | | |
|---|---|---|---|---|
| 2004/0134930 | A1 | 7/2004 | Hiraki et al. | |
| 2004/0139908 | A1* | 7/2004 | Bowe | C30B 7/00 117/1 |
| 2007/0025178 | A1 | 2/2007 | Kao et al. | |
| 2013/0186970 | A1* | 7/2013 | Hagata | B01F 35/95 239/132.3 |
| 2013/0194888 | A1* | 8/2013 | Hotta | B01F 27/41 366/132 |
| 2013/0201785 | A1* | 8/2013 | Dahms | B01F 33/4531 366/343 |
| 2014/0004367 | A1 | 1/2014 | Sugiyama et al. | |
| 2018/0186670 | A1* | 7/2018 | Philpott | B01F 23/53 |

FOREIGN PATENT DOCUMENTS

| | | | |
|---|---|---|---|
| CN | 207287617 | U | 5/2018 |
| CN | 108786509 | A | 11/2018 |
| EP | 2657263 | A1 | 10/2013 |
| GB | 1374214 | | 11/1974 |
| JP | 2005224738 | A | 8/2005 |
| JP | 2006000751 | A | 1/2006 |
| JP | 2006221023 | A | 8/2006 |
| WO | 2012086373 | A1 | 6/2012 |

OTHER PUBLICATIONS

Kresta, S. & Dickey, D. (2016). Flow Patterns and Mixing, In S. Kresta, A. Etchells, D. Dickey & V. Atiemo-Obeng (Eds.), Advances in Industrial Mixing—A Companion to the Handbook of Industrial Mixing (pp. 153-187). John Wiley & Sons. (Year: 2016).*

Liu, M. (2012).Age distribution and the degree of mixing in continuous flow stirred tank reactors, Chemical Engineering Science, 69(1), pp. 382-393. (Year: 2012).*

Padron, G. & Ozcan-Taskin, G. (2018). Particle de-agglomeration with an in-line rotor-stator mixer at different solids loadings and viscosities, Chemical Engineering Research and Design, 132, pp. 913-921. (Year: 2018).*

International Search Report and Written Opinion for corresponding PCT/EP2020/072568 mailed Sep. 8, 2020, 10 Pages.

Yang, "Traditional Chinese Medicine Preparation", Pharmacy of Chinese Medicine, Chapter 15 Granules, pp. 289-290 (2016) (English translation attached).

* cited by examiner

METHOD FOR DISPERSING AND MILLING PARTICLES IN A FLUID

CROSS-REFERENCE TO RELATED APPLICATIONS

This application is a U.S. National Phase Application of International Patent Application No. PCT/EP2020/072568, filed Aug. 12, 2020, which claims priority to European Patent Application No. 19306027.4, filed Aug. 22, 2019, the entire contents of which are hereby incorporated by reference herein.

FIELD OF THE INVENTION

The invention relates to a method and an optimized system for dispersing and milling particles by recirculation in a fluid.

BACKGROUND OF THE INVENTION

Dispersing and milling particles evenly in a fluid can be very difficult. In many applications it is necessary to reduce the size of particles and agglomerates that are dispersed in a fluid by milling, for instance, during the production of paint using a liquid binder and particles of a coloured pigment. One solution for dispersing particles in a fluid, for instance, colour pigment in a binder, while further reducing the size of the particles, is to provide a recirculation through a bead mill, in which the fluid with the particles is continuously stirred in a stirring container, like a vessel, mixing tank, stirring tank, homogenizer, etc., and at the same time recirculated through a mill that reduces the size of the particles with each pass through the mill until a desired particle size and the targeted properties of the mix, for instance, a stable product in aging with a good wetting of small particles by the binder, is reached. In the current design of such recirculation systems, the average size of the particles in the fluid is only reduced very slowly with each pass of the fluid through the mill. Accordingly, many cycles are necessary to reach the desired average particle size, wherein one cycle refers to one stirring container volume of fluid having passed through the mill.

Related art is, for instance, US 2007/025178 A1, U.S. Pat. No. 1,781,435 A, EP 2657263 A1, and US 2004/134930 A1.

Thus, it would be advantageous to provide a method and a system that allow to reduce the number of cycles of the fluid through the mill such that time and energy in the production of products comprising particles dispersed in a fluid can be reduced.

SUMMARY OF THE INVENTION

It is an object of the present invention to provide a method and a system for dispersing particles in a fluid that allow to reduce the production time and energy for products produced in a recirculation process.

In a first aspect of the present invention, a method for dispersing and milling particles in a fluid is provided, wherein the method comprises the steps of a) introducing the fluid comprising the particles into a stirring container, wherein the particles comprise a starting average particle size, b) stirring the fluid in the stirring container using stirring means positioned at a predetermined stirring position within the stirring container, and, during stirring, i) recirculating the fluid comprising the particles by continuously retrieving an amount of fluid comprising particles from a predetermined retrieving position in the stirring container by using retrieving means, ii) milling the particles in the continuously retrieved fluid using milling means, wherein during each pass through the milling means a size of particles in the retrieved fluid is reduced if the particles have a size above a predetermined particle size, iii) continuously reintroducing the retrieved fluid having passed through the milling means to the stirring container at a predetermined reintroduction position using reintroduction means, wherein the reintroduced fluid comprising the particles with a reduced size is mixed with the fluid in the stirring container in a mixing region defined by the stirring means, and wherein the retrieving position is determined such that the retrieved fluid comprises particles with an average particle size differing from the average particle size of particles in the fluid in the mixing region.

Since the retrieving position for retrieving the fluid from the stirring container to be passed through the mill is determined such that the retrieved fluid comprises particles with an average particle size differing from the average particle size of particles in the fluid in the mixing region as defined by the stirring means, it can be assured that fluid comprising particles that have not passed the mill often enough, i.e. the size of which is still too large, is sent to the mill, whereas the amount of particles in the retrieved fluid that already have been milled during a previous pass is reduced. Accordingly, the size of the particles can be reduced more effectively, i.e. in each pass more particles of a larger size are sent through the mill than particles having already a smaller size. Thus, the number of passes necessary for reaching a predetermined average particle size can be reduced, which leads to a reduction of the production time and energy for producing a given final product.

In particular, it has been found by the inventors that in a stirring container in which a fluid is stirred using stirring means, like an impeller, mixing between an introduced fluid and the fluid in the container will not take place throughout the whole stirring container. Due to vortexing, i.e. the forming of at least one vortex within the fluid, mixing will mainly take place in a region around the stirring means, for instance, around the impeller.

From there, the mixed fluid will slowly be transported to other parts of the stirring container. Accordingly, if the fluids mixed in the stirring container comprise particles with different sizes, for instance, when the fluid within the container comprises particles of a first particle size and the fluid introduced in the stirring container comprises particles of a second particle size, wherein the first particle size is larger than the second particle size, the particles of different sizes will also only be mixed in the mixing region. Thus, firstly, the average size of the particles is reduced in the mixing region, whereas in all other regions of the container the average particle size is only reduced very slowly together with the transport of the mixed fluid into other regions of the stirring container. The inventors have realized that this mixing phenomenon comprising different internal streams can be used as an advantage for a more effective method and system for recirculating a fluid comprising particles the size of which should be reduced by letting the fluid pass through a mill during a recirculation process. Retrieving the fluid comprising the particles from a region of the container outside the mixing region ensures that the amount of particles in the retrieved fluid that still have to be milled at least once is maximized. Thus, the milling of the particles will be more effective and the production time of the final product comprising a predetermined average particle size is reduced.

In the method according to the invention, first the base product, i.e. a fluid comprising particles with a starting average particle size, is introduced into the stirring container. The base product can be, for instance, a resin comprising colour pigments, a water solution comprising ink pigments, etc. The stirring container can be any container that is adapted for being used in a stirring process, for instance, the stirring container can be cylinder-shaped.

After the introduction of the fluid into the container, the fluid comprising the particles is stirred using stirring means positioned at a predetermined stirring position within the stirring container. The stirring means can be any means that are suitable for stirring a fluid in a container. The stirring means can comprise, for instance, an impeller that is electrically or hydraulically driven to rotate within the fluid (or can comprise a stir bar that is driven by a magnetic field to rotate in the stirring container). The predetermined stirring position refers to the height in which the stirring means is positioned and can be, for instance, at or near the bottom of the container, in the middle of the container, or in an upper part of the container. The stirring means define a mixing region in which a mixing between the fluid within the stirring container and the reintroduced fluid takes place, for instance, due to turbulent or quasi turbulent mixing. This region can be determined for any construction of the stirring container and the stirring means, for instance, through experiment or in a numerical simulation.

During the stirring the fluid is recirculated, i.e. an amount of fluid is removed from the container, sent through a mill and then reintroduced into the container. In particular, an amount of fluid is continuously retrieved from a predetermined retrieving position in the stirring container by retrieving means. In particular, the retrieving position is determined such that the retrieved fluid comprises particles with an average particle size greater than the average particle size of particles in the fluid in the mixing region. The retrieving means can refer, for instance, to a pipe or a duct through which the retrieved fluid can flow. The amount of fluid that is continuously retrieved from the container can be determined by the size of the retrieving means, for instance, by a diameter of the pipe or duct, and a flow velocity of the fluid through the retrieving means. The flow of the retrieved fluid through the retrieving means can be driven, for instance, by a pump connected to the retrieving means.

In another step of the recirculating process, the continuously retrieved fluid is passed through milling means for milling the particles in the retrieved fluid. The milling means are adapted to reduce the size of the particles with each pass of the particles through the milling means if the particles have a size above a predetermined particle size, i.e. until a predetermined particle size is reached at which the particles might pass the mill substantially unchanged. This predetermined particle size might be determined by the construction of the milling means. Moreover, the milling means can refer to any means that are suitable for reducing the size of particles in a fluid.

After the particles have been milled, the retrieved fluid comprising particles with a reduced particle size is continuously reintroduced into the stirring container at a predetermined reintroduction position by reintroduction means. Also the reintroduction means can comprise, for instance, a pipe or a duct through which the fluid flows into the stirring container. Preferably, the amount of fluid that is retrieved from the stirring container at any time is substantially the same as the amount of fluid that is reintroduced into the stirring container at any time. Moreover, it is preferred that the retrieving means and the reintroduction means are directly connected to the milling means such that the fluid flows continuously through the retrieving means into the milling means and from the milling means through the reintroduction means into the stirring container. The reintroduction position can be in different places in the stirring container, for instance, the reintroduction position can be in an upper part of the container. Moreover, the reintroduction means might be connected to the stirring means such that the fluid is reintroduced into the container at or near the position of the stirring means. Preferably, the fluid is reintroduced at or near a surface of the fluid within the stirring container, more preferably near or against an inner wall of the stirring container over the surface of the fluid. Generally, it is preferred that the reintroduction position is chosen such that the reintroduced fluid cannot flow to the retrieving position without first being mixed with the fluid in the container, i.e. cannot flow to the retrieving position without passing the mixing region.

Preferably, the recirculation and mixing is aborted if the particles have on average reached a predetermined final size corresponding to a size of the particles that is desired in the final product. The predetermined final size can be regarded as a first threshold for controlling the recirculation and mixing process and can correspond to the predetermined size defined by the milling means, for instance, the size reachable by the milling means, or can correspond to a size greater than defined by the milling means, for instance, a size greater than reachable by the milling means. Preferably, when the particles in the product on average comprise the final size, the final product comprises desired characteristics, for instance, a desired colour, viscosity, rheology, etc.

In an embodiment, the mixing region is determined as a region of an inner volume of the stirring container comprising the highest change rate of an average particle size of particles in the fluid compared with particles in the fluid in other regions of the inner volume of the container. Since particles that have recently passed the mill, and thus comprise a reduced size, are firstly mixed with particles that have not yet passed the mill or have not passed the mill often enough in the mixing region of the stirring container, i.e. in the region in which the fluid within the stirring container and the reintroduced fluid are mixed, in this region the average particle size will change much faster than in any other part of the stirring container. Preferably, the average particle size decreases in the mixing region much faster than in the other regions of the stirring container. Thus, the mixing region can be easily determined by measuring a change rate of an average particle size in a stirring container, wherein the mixing region is then the region showing the highest change rate of the average particle size. Alternatively, the expected average particle sizes and thus the mixing region can be determined beforehand using computer simulations, or laboratory experiments using glass equipment with a similar geometry and in a similar condition as in a later industrial installation.

In an embodiment, the method comprises determining the retrieving position by determining a retrieving region as a region within an inner volume of the stirring container, wherein the retrieving region is determined such that it comprises a highest average particle size within the stirring container compared to other regions of the stirring container, and wherein the retrieving position is provided within the determined retrieving region. This embodiment corresponds to determining the retrieving region as the region with the highest percentage of particles that have not yet passed the mill or have not yet passed the mill often enough compared to all other regions of the fluid in the stirring container.

The retrieving region refers to a 3D region within the stirring container having an arbitrary shape and an arbitrary volume much smaller than the volume of the stirring container. Preferably, the volume of the retrieving region comprises less than 10% of the volume of the stirring container. Further, it is preferred that the arbitrary shape of the retrieving region has a height much smaller than the height of the stirring container, for instance, the height of the retrieving region can be smaller than 10% of the height of the stirring container. The retrieving region can be determined particularly accurately when an average particle size in the retrieving region can be determined with an adequate accuracy, i.e. when a statistically relevant amount of particles can be found in the retrieving region at all times, for instance, when at least ten percent of the particles are found in the retrieving region at all times. In other embodiments, the retrieving region can be determined using theoretical considerations with respect to the average particle size, independent of the real amount of particles in the retrieving region.

The retrieving region can, for instance, be determined during a computational simulation or during an experiment by placing a candidate region with a chosen volume and shape at a plurality of locations inside the volume of a stirring container simulating the stirring container used in a later industrial application. The candidate regions can then be placed such that the whole volume of the stirring container was at least once part of a candidate region. This can be done by subdividing the volume of the stirring container into candidate regions without an overlap of the candidate regions, or by arbitrarily placing the candidate regions within the volume of the stirring container, wherein overlaps can occur. The average particle size can then be determined for each of these candidate regions during the recirculation process and compared with the average particle size of all other candidate regions. The candidate volume with the highest average particle size during substantially the whole circulation process compared with the other candidate regions is then chosen as the retrieving region in the industrial application. The retrieving position can then be provided anywhere in this retrieving region, for instance, in the middle of the retrieving region. Alternatively, the retrieving region can be determined in a computer simulation or an experiment by dividing the simulated stirring container into a plurality of equally sized small volumes, each volume being much smaller than the volume of the stirring container and being only great enough to allow for suitable statistics of the average particle size of the experiment or simulation, i.e. being great enough to comprise at least ten percent of the particles on average over, for instance, a simulated recirculation process. For each of the volumes the average particle size over time during the recirculation process can then be calculated. The retrieving region can then be defined as a region in which the small volumes show the highest average particle size of all volumes over the time of the recirculation process.

The determination of the retrieving region can be done during an experiment, a numerical simulation or using theoretical calculations of the reintroduction process. If an experiment is used, the retrieving region can be determined in accordance with the above principles, for instance, by using a small test installation comprising the same fluid flows as the later industrial application and by using a suction pipe as retrieving means with an adjustable position. Then the average particle size can be determined for different regions or volumes from the fluid extracted by the suction pipe at different positions during the course of the experiment, i.e. the course of the recirculation and milling.

In a preferred embodiment, the mixing region and the retrieving region do not overlap. Moreover, in an embodiment also the mixing region can be determined in accordance with the above described principles.

In an embodiment, the formation of the mixing region is determined based on the stirring position of the stirring means. Since the stirring means stir the fluid within the stirring container, turbulent or quasi turbulent fluid flow is introduced into the fluid flow within the container in a region around the stirring means, in particular in a region extending from the stirring means outwards to the walls of the container. Accordingly, the mixing of the fluid within the container and the reintroduced fluid takes place mainly at the position of the stirring means. Thus, the formation and position of the mixing region can be determined based on the stirring position of the stirring means.

In an embodiment, the reintroduction position is provided above the stirring position. Preferably, the reintroduction position is provided in an upper half of the container, preferably at or over the surface of the fluid in the stirring container. Preferably the reintroduction position is provided above the surface of the fluid within the stirring container such that the fluid is reintroduced in the direction of an inner wall of the stirring container. This configuration allows to reduce the risk of static electric charge build up.

In an embodiment, the stirring position is provided within an upper half of the stirring container and the retrieving position is provided in a lower half of the stirring container. Experiments and simulations have shown that if the stirring position is in an upper half of the stirring container, the mixing of the reintroduced fluid and the fluid within the container takes place mainly in the upper half of the container. Accordingly, particles that have not passed the mill already or as often as others can mainly be found in the lower half of the stirring container. Thus, the average particle size in the lower half of the stirring container remains higher than in the upper half of the stirring container during the recirculation process. It is therefore advantageous to provide a retrieving position in the lower half of the stirring container for this configuration. Preferably, this embodiment is used in applications comprising fluids with a high viscosity that might cause difficulties when pumped. In such cases the retrieving position at the bottom can facilitate the pumping of the fluid.

Alternatively, in an embodiment the stirring position is provided within a lower half of the stirring container and the retrieving position is provided in an upper half of the stirring container. If the stirring position is provided within a lower half of the stirring container, it has been found through experiment and simulation that the mixing between the reintroduced fluid and the fluid within the container takes place mainly within the lower half of the stirring container, although the fluid is reintroduced in the upper half of the container. Accordingly, it is advantageous to provide the retrieving position in the upper half of the stirring container. In a preferred modification of this embodiment, an additional retrieving means are provided at the bottom of the stirring container, wherein the retrieving means and the additional retrieving means are connected and wherein the additional retrieving means comprises fluid regulation means, like a valve or a volumetric pump with a speed variator, for regulating the retrieving of fluid with the additional retrieving means. Preferably, the fluid regulation means are adapted to regulate the flow such that the flow through the additional retrieving means is increased when it is determined that the effort for pumping is increased, for instance, if cavitation noise from a pump pumping the fluid through the retrieving means is detected. This embodiment is especially advantageous for saving energy for operating the pump.

In an embodiment, the fluid comprises a binder and the particles comprise a colour pigment. For instance, the binder can comprise a resin, additives for wetting and/or solvents.

In an embodiment, the stirring means comprise an impeller, wherein the step of stirring the fluid content of the stirring container comprises rotating the impeller. Preferably, the impeller is rotated through rotating means like an electromotor connected via a rotating rod with the impeller. Alternatively, the impeller can also be rotated using a rotating magnetic field. Preferably, the impeller is rotated using speed variation providing means such that the speed of rotation of the impeller can be varied. The speed variation providing means are preferably adapted to adjust the rotation speed of the impeller such that a sedimentation of particles at the bottom of the stirring container can be avoided. Moreover, the speed variation providing means are preferably adapted to adjust the rotation speed of the impeller such that a vortex flow in the middle of the stirring container, for instance, around the rotating rod, is driven by the rotation of the impeller. A preferred rotation speed for the impeller corresponds to 2 to 3 times less than a speed used for dissolving the particles in the fluid before starting the recirculation and milling, for instance, the speed can be 200 to 300 rotations per minute (RPM) in certain embodiments. The impeller can be, for instance, a Cowsle disk, alternatively the impeller can correspond to an axial propeller.

In an embodiment, the method is a control method and comprises controlling a recirculation rate based on the average particle size in the retrieved fluid. The average particle size in the retrieved fluid can be determined directly, for instance, by optical particle size measurement methods that allow to measure the size of particles in the flowing fluid. Alternatively, the average particle size can be determined indirectly, for instance, by measuring a certain property of the fluid comprising the particles that changes with the average particle size. The properties can refer, for instance, to light diffusion properties of the fluid, to a colour of the fluid, to a transparency of the fluid, to a flow property like a viscosity of the fluid, etc. The recirculation rate can then be controlled based on the determined average particle size in the fluid that has been retrieved from the stirring container.

Preferably, the method comprises decreasing the recirculation rate if the average particle size in the retrieved amount of fluid is lower than a predetermined first threshold and/or if a difference between the average particle size in the retrieved amount of fluid and the average particle size in the mixing region is lower than a predetermined second threshold. More preferably, the slowing of the recirculation rate comprises stopping the recirculation if the above conditions are met. Accordingly, the process can be controlled such that it is stopped if a predetermined criterion, like the average particle size in the retrieved amount of fluid or a difference between the average particle size in the retrieved amount of fluid and the average particle size in the mixing region falling below a predetermined threshold, is met. The threshold might be defined in accordance with a quality criterion of a desired end product. Moreover, the recirculation might additionally be controlled based on a time of recirculation, based on a pressure measured inside the mill, based on a temperature of the fluid in the stirring container, based on a total energy, etc.

In a further aspect of the present invention, a system for dispersing and milling particles in a fluid is provided, wherein the system comprises a) a stirring container adapted to hold the fluid comprising the particles, b) stirring means for stirring the fluid in the stirring container, wherein the stirring means are positioned at a predetermined stirring position within the stirring container, c) recirculating means comprising i) retrieving means adapted to continuously retrieve an amount of fluid comprising particles from a predetermined retrieving position in the stirring container, ii) milling means adapted to mill the particles in the continuously retrieved fluid, wherein during each pass through the milling means a size of the particles in the retrieved fluid is reduced if the particles have a size above a predetermined particle size, and iii) reintroduction means adapted to continuously reintroduce the retrieved fluid having passed through the milling means to the stirring container at a predetermined reintroduction position, wherein the stirring means define a mixing region in the stirring container in which the reintroduced fluid comprising the particles with a reduced size is mixed with the fluid in the stirring container, and wherein the retrieving position is provided such that the retrieved fluid comprises particles with an average particle size differing from the average particle size of particles in the fluid in the mixing region.

In a further aspect of the present invention, recirculation means comprising retrieving means, milling means and reintroduction means are used with a stirring container comprising stirring means such that a number of passes through the milling means required to reach a predetermined average particle size throughout a fluid within the stirring container is decreased. Preferably, recirculation means as described above are used together with stirring means as also described above.

It shall be understood that the method of claim 1 and the system of claim 11 have similar and/or identical preferred embodiments, in particular as defined in the dependent claims.

It shall be understood that a preferred embodiment of the present invention can also be any combination of the dependent claims or above embodiments with a respective independent claim.

These and other aspects of the invention will be apparent from and elucidated with reference to the embodiment described hereafter.

DETAILED DESCRIPTION OF EMBODIMENTS

Figure 1:
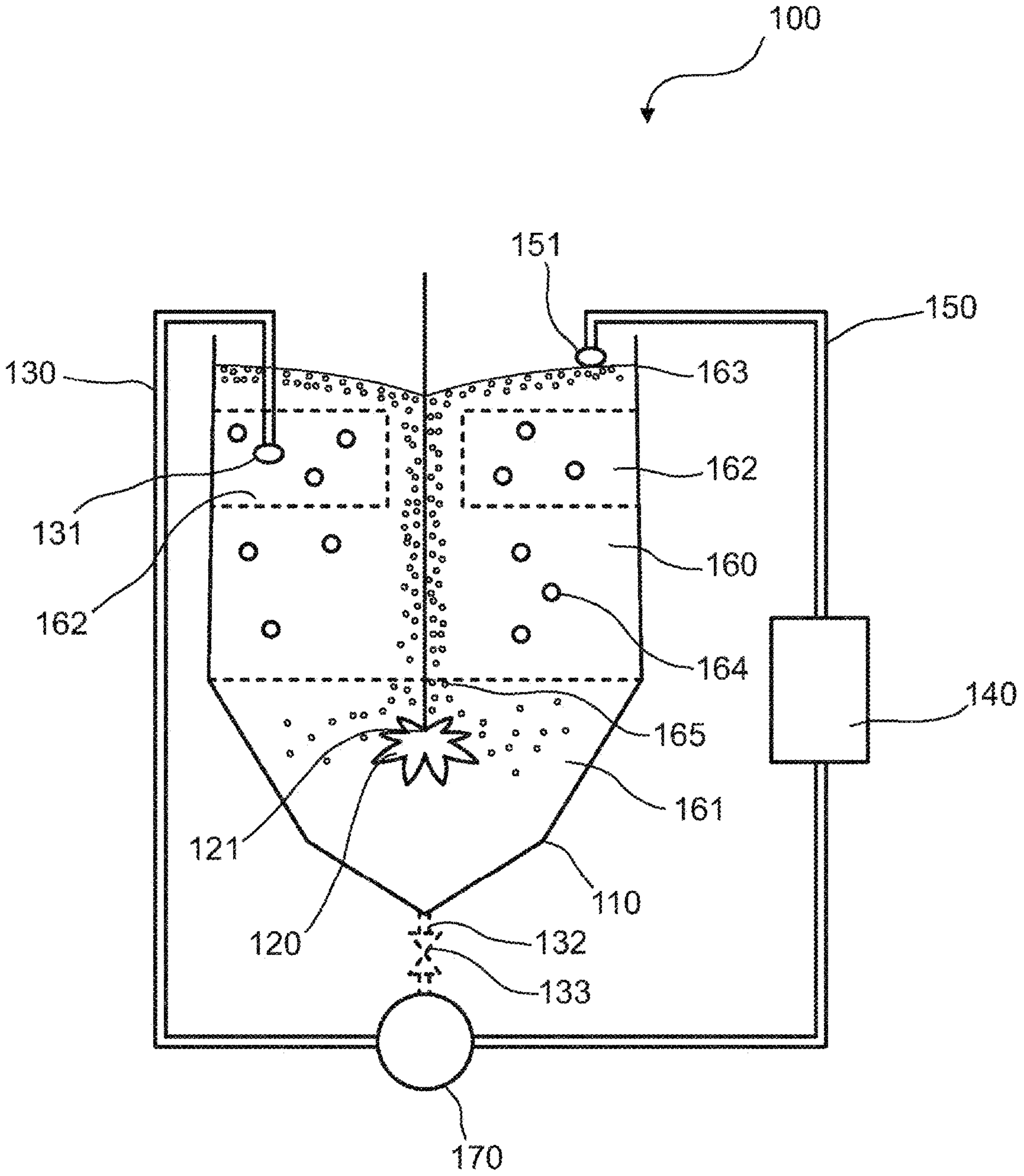
FIG. 1 shows schematically and exemplarily an embodiment of a system for dispersing and milling particles in a fluid by recirculation.

FIG. 1 shows schematically and exemplarily an embodiment of a system for dispersing and milling particles in a fluid by recirculation. In this embodiment, the system 100 comprises a stirring container 110 into which a fluid 160 comprising particles 164 can be introduced. Stirring means 120 are provided at a stirring position 121 within the stirring container 110. In this exemplary embodiment, the stirring position 121 is provided within a lower half of the stirring container 110. In this embodiment, the stirring means 120 comprise an impeller, wherein the impeller is rotated and causes turbulent fluid flows in the vicinity of the impeller. In this embodiment, the impeller is a Cowsle disk. In a preferred embodiment the impeller is rotated with a rotation speed of 2 to 3 times the rotational speed used for dispersing the particles before the recirculating and milling is started. Preferably, the speed of the impeller is regulated such that a vortex is generated in the stirring container 110. The turbulent fluid flows in the vicinity of the impeller define a mixing region 161 in which the fluid 160 and fluid that is reintroduced into the stirring container 120 can be mixed. The system 100 further comprises recirculating means comprising retrieving means 130, milling means 140 and reintroduction means 150.

In this embodiment, the retrieving means 130 refer to a pipe that is connected with a pump 170 for pumping fluid that is retrieved from the stirring container 110 by the retrieving means 130 through the retrieving means 130 to the milling means 140 and further through the reintroduction means 150 back into the stirring container 110. The retrieving means 130 preferably comprise an opening that is configured to use the rotational energy of the fluid flowing into the pipe to facilitate the operation of the pump 170. For instance, the opening of the pipe can be adapted such that the retrieving means 130 opens in the direction of the fluid flow of the surrounding fluid, for instance, the end of the pipe can be cut in a diagonal manner to form an elliptical opening in the direction of the fluid flow.

The retrieving means 130 are positioned such that the fluid 160, together with particles 164 within the fluid 160, is retrieved from the stirring container 110 at a stirring position 131. The retrieving position 131 is chosen such that it lies within a region 162 of the stirring container 110 that has in this particular embodiment a cylindrical ring shape. The retrieving region 162 is defined as a region comprising the highest average particle size with respect to other regions within the container 110. The retrieving region 162 has been found for this particular construction of the stirring container 110, for instance, by experiments and/or numerical simulations. For instance, during a numerical simulation the simulated stirring container 110 might be divided into a plurality of equally sized small volumes, wherein for each of the volumes the average particle size over time during the recirculation process can be calculated. The retrieving region 162 is then defined as a region in which the volumes show the highest average particle size of all volumes over the time of the recirculation process. The retrieving means 130 can then be constructed such that the retrieving position 131 is found anywhere within the retrieving region 162.

After the fluid comprising the particles is retrieved by the retrieving means 130, the fluid flows through the retrieving means 130 to the milling means 140. The milling means can comprise any kind of mill that allows to reduce the size of the particles 164 within the retrieved fluid 160.

The retrieved fluid 160 comprising the particles 165 with reduced size is then reintroduced into the stirring container 110 by the reintroduction means 150 at a reintroduction position 151. In this embodiment, the reintroduction position 151 is provided near a surface 163 of the fluid 160 within the stirring container 110. In an alternative embodiment the reintroduction position 151 can be provided above the surface of the fluid 160 such that the reintroduced fluid is provided against an inner wall of the stirring container 110 and flows down to the surface of the fluid 160 along the inner wall of the stirring container 110.

FIG. 1 further shows an exemplary flow of the reintroduced fluid represented by the milled and thus smaller particles 165. After the reintroduction of the fluid comprising the milled particles 165 the fluid circulates at the top of the surface of the fluid in the stirring container in a spiral form, wherein the fluid in the respective spiral is then sucked down in the middle of the spiral into a vortex formed, in this embodiment, along and around a shaft holding the stirring means 120 until the fluid with the smaller particles 165 reaches the stirring means 120. Such a fluid flow is also called a helicoidal stream. In the region of the stirring means 120 the fluid is then subject to an expulsion in a radial area to form substantially a disk volume, wherein this disk volume is then growing with time like a "stack of plates". This general fluid flow in a stirring container can be subject to certain modifications based on the exact structure and design of the stirring means. For instance, if the stirring means 121 comprises blades linked to the shaft by simple rods, the helicoidal stream takes the form of a cylinder with a diameter greater than the shaft and never touching the shaft. If the blades are welded directly to the shaft the helicoidal stream directly touches the shaft like a coat. However, the general principle of the fluid flow of the reintroduced fluid as described above remains independent of the specific embodiment of the stirring means 120.

Further, FIG. 1 shows a modification of the above described embodiment. In this modification indicated by the dotted lines an additional retrieving means 132 is provided comprising a valve 133. In this embodiment a small amount of fluid, for instance, 20 to 30 percent of the amount of fluid retrieved by the retrieving means 130 is also retrieved by the additional retrieving means 132 at the bottom of the stirring container 110. The valve 133 is provided to regulate the amount of fluid retrieved by the additional retrieving means 132. Preferably the valve is controlled based on the current pumping performance of the pump 170. For instance, if the viscosity of the fluid is such that the pumping performance is not optimal, the valve can be opened and the additional retrieved fluid following the force of gravity can support the pumping of the fluid. Moreover, it is preferred that if cavitation occurs in the pump 170, for instance, if cavitation noise is detected, the valve 133 is used to provide more retrieved fluid from the additional retrieving means 132 to avoid damage to the pump. This embodiment is especially advantageous in applications comprising high viscosity fluids.

Figure 2:
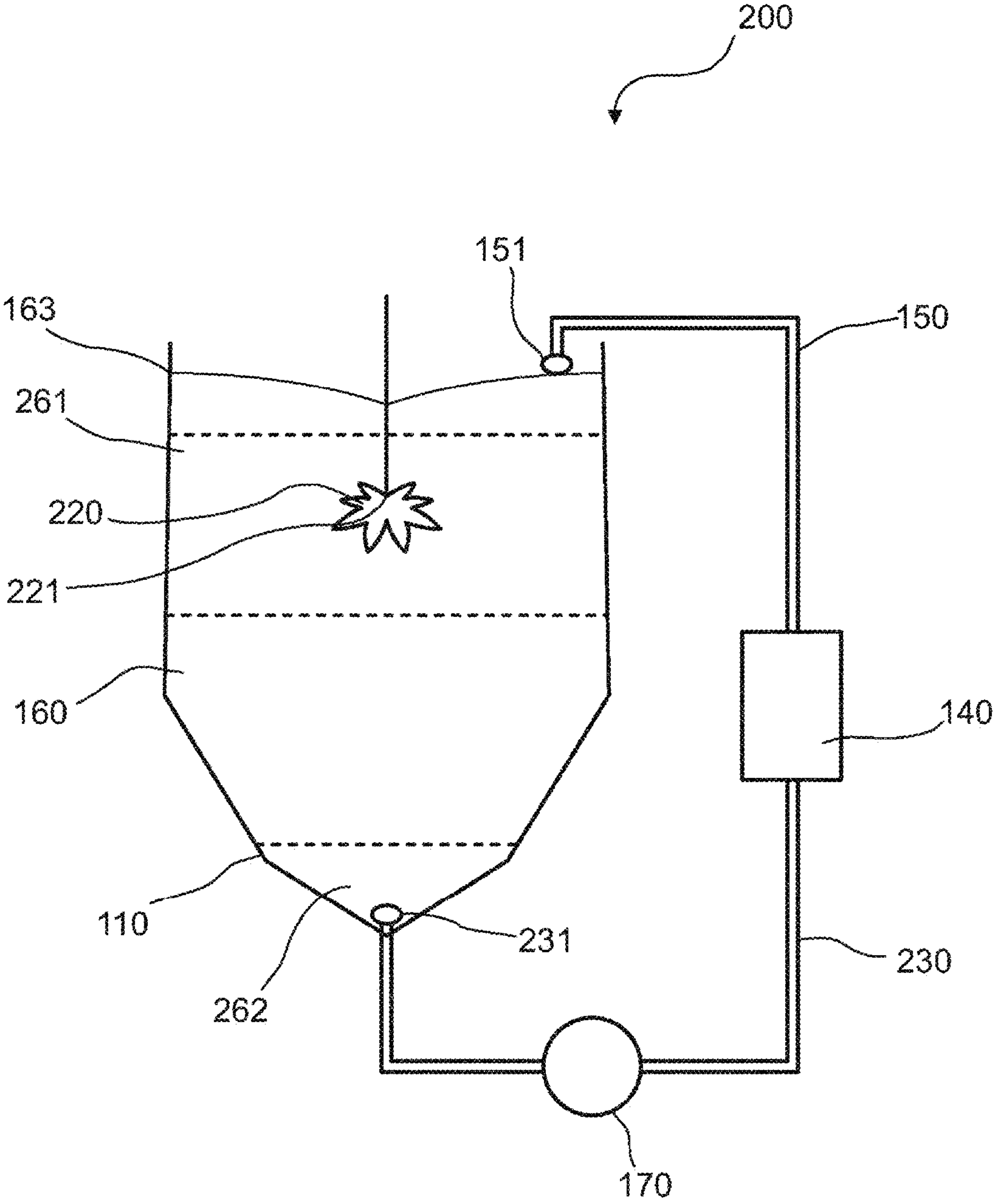
FIG. 2 shows a flowchart exemplarily illustrating an embodiment of a method for dispersing and milling particles in a fluid by recirculation.

FIG. 2 shows another embodiment of the system for milling particles in a fluid by recirculation schematically and exemplarily, wherein components that are similar to the above described embodiment of the system shown in FIG. 1 comprise the same reference signs. In the system 200 the stirring means 220 are provided at the stirring position 221, wherein the stirring position 221 in this embodiment is provided in the upper half of the stirring container 110. Accordingly, also the mixing region 261 can be found in this embodiment in the upper half of the stirring container 110. It has been determined that the retrieving region 262 in this embodiment can be found in the lower half of the stirring container 110. Thus, in this embodiment retrieving means 230 are positioned such that the retrieving position 231 is provided within the retrieving region 262. In particular, in this embodiment the retrieving position 231 is provided at the bottom of the stirring container 110.

Figure 3:
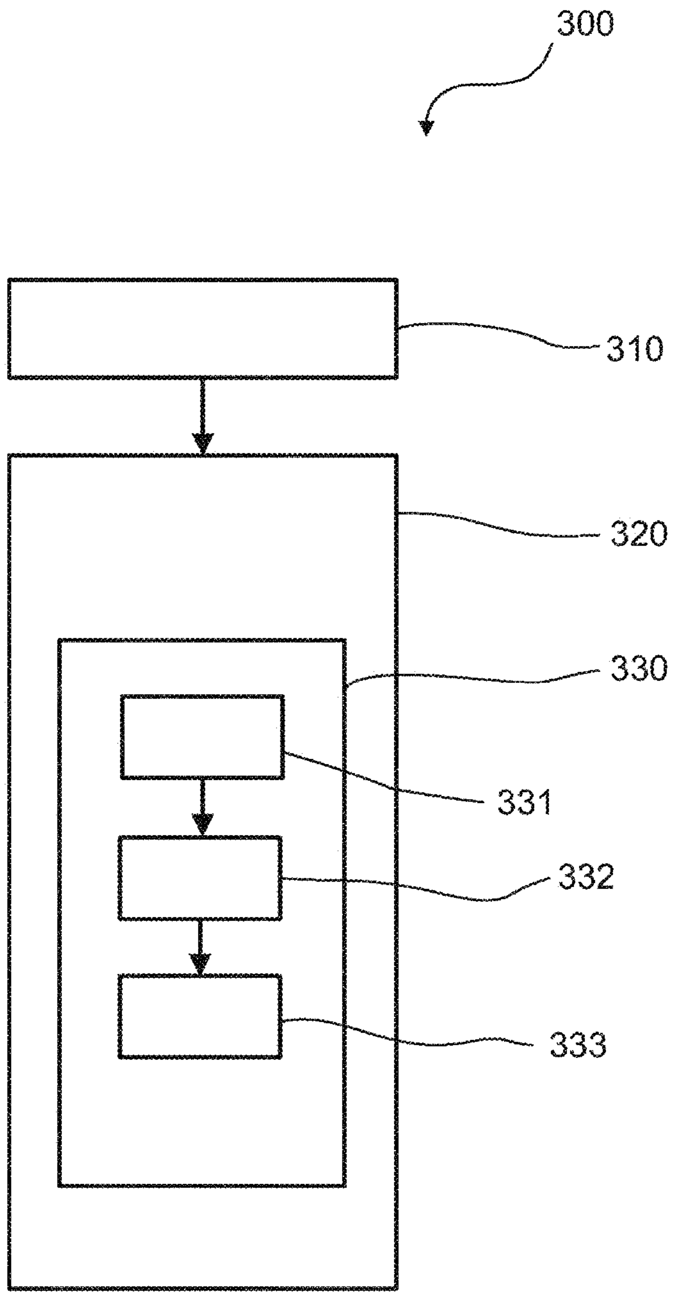
FIG. 3 shows schematically and exemplarily an illustration of processes taking place during an execution of an embodiment of the method for milling particles in a fluid by recirculation, and FIG. 4, comprising

With reference to FIGS. 3 and 4, in the following a method for dispersing and milling particles by recirculation in a fluid according to the invention will be schematically and exemplarily explained. In a first step 310 of the method 300 a fluid 160 comprising particles 164 with a starting average particle size is introduced into a stirring container 110 as, for instance, shown in FIG. 1. In a next step 320 the fluid 160 within the stirring container is stirred using stirring means 120 as, for instance, also shown in FIG. 1. During the stirring the fluid 160 is recirculated in step 330.

Figure 4A:
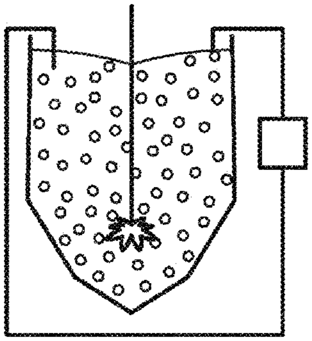
FIG. 4A to 4E, illustrates schematically and exemplarily an internal fluid flow for an embodiment of the system for milling particles in a fluid by recirculation.
Figure 4B:
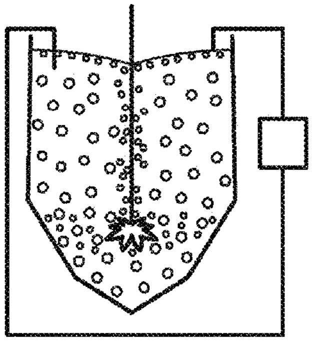
Figure 4C:
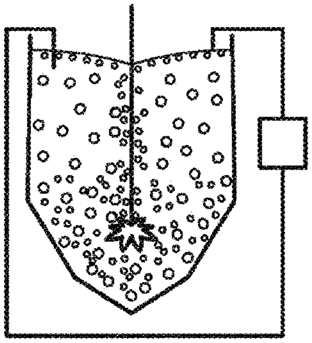
Figure 4D:
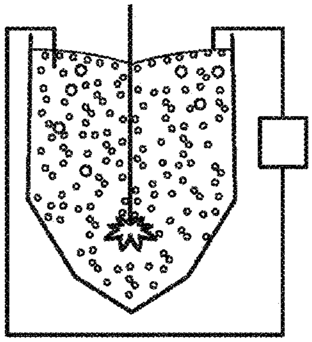
Figure 4E:
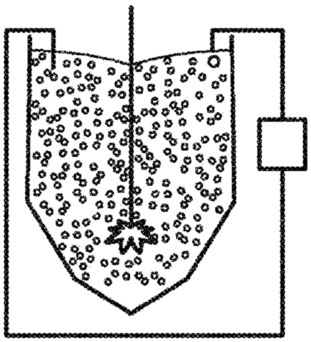

The recirculating and the effects of the recirculating will be explained in more detail also with reference to FIG. 4. FIG. 4 shows schematically and exemplarily the effects of the method for dispersing particles in a fluid. In FIG. 4A, the state of the fluid comprising the particles at the beginning of the recirculation process is shown. In this state the particles comprise mainly the same size, i.e. a first particle size. In step 331 an amount of fluid is continuously retrieved from the stirring container from a retrieving position that is shown in FIG. 4A in accordance with the embodiment of the system shown in FIG. 1, i.e. the fluid is retrieved at the left side of the container in the upper half of the container. Since in this state the fluid within the container only comprises particles of the first particle size, the retrieved fluid also only comprises particles of the first particle size. In step 332 the retrieved fluid is provided to milling means that reduce the size of the particles within the fluid. Accordingly, after milling, the retrieved fluid comprises particles with a reduced particle size, i.e. comprising a second particle size. To facilitate the understanding in the schematic process shown in FIG. 4, the second particle size also refers to a predetermined final particle size that should be provided in the end product of the process, wherein for explanatory reasons the particles of the second particle size will pass the mill unchanged. The retrieved fluid comprising the particles with reduced particle size, here with the second particle size, is in step 333 reintroduced into the stirring container near the surface of the fluid within the fluid container, as can be seen in FIG. 4B. It is also shown in FIG. 4B that due to vortexing the fluid comprising the particles with the second particle size flow along the surface of the fluid in the stirring container and then along a vortex around a rod holding the impeller downwards to the impeller without substantially mixing with the fluid within the container comprising particles of the first particle size. Only in a region in which the impeller induces turbulent flow the fluid comprising the particles of the second particle size and the fluid within the container still comprising particles of the first particle size are mixed. Accordingly, as can also be seen in FIG. 4B, in this region an average particle size is reduced very fast due to the continuous provision of particles of the second particle size into this region. Contrary to this, the average particle size in the retrieving region still substantially corresponds to the first particle size and changes only very slowly due to slow transportation processes from the mixing region into the upper regions of the stirring container. Such a slow transportation process can be schematically seen in FIGS. 4C and 4D. Moreover, it is shown in FIGS. 4C and 4D that due to the continuous provision of small particles to the mixing region and the retrieving of the larger particles from the retrieving region the overall average particle size is decreased, wherein the average particle size decreases faster in the mixing region than in the retrieving region until the average particle size in the mixing region mainly corresponds to the second particle size. FIG. 4E shows a state at which a reintroduction process is stopped, since the average particle size of the particles within the retrieved fluid is below a threshold lying only slightly above the second particle size, such that the final product fulfils a predetermined quality criterion.

Although in the above embodiments a specific configuration showing a specific flow pattern was described, in other embodiments the flow pattern can be different. For instance, also other flow patterns of the fluid and, accordingly, other specific configurations of the stirring container and the stirring means that allow to determine a region with higher average particle sizes can be contemplated. In general, the invention refers to retrieving fluid for milling from a region of a stirring container comprising on average more particles that are still to big, i.e. retrieve fluid with particles having a higher average particle size then other regions of the stirring container, wherein according to this principle the efficiency of the milling process can be increased and a milling product of high quality can be reached in a shorter time.

Other variations to the disclosed embodiments can be understood and effected by those skilled in the art and practising the planned invention from the study of the drawings, the disclosure and the appendant claims.

In the claims, the word “comprising” does not exclude other elements or steps, and the indefinite article “a” or “an” does not exclude a plurality.

Any reference signs in the claims should not be construed as limiting the scope.

The invention refers to a method and a system for dispersing and milling particles in a fluid. The method comprises stirring a fluid comprising particles in a stirring container using stirring means. During stirring the fluid is recirculated by continuously retrieving an amount of fluid from a retrieving position. Further, the particles are milled, wherein during each pass through the milling means a size of particles in the retrieved fluid is reduced. Moreover, the retrieved fluid having passed through the milling means is continuously reintroduced into the stirring container at a reintroduction position. The reintroduced fluid is mixed with the fluid in the stirring container in a mixing region defined by the stirring means, and the retrieving position is determined such that the retrieved fluid comprises particles with an average particle size differing from the average particle size of particles in the mixing region.

The invention claimed is:

1. A method for dispersing and milling particles in a fluid, wherein the method comprises the steps of:

introducing the fluid comprising the particles into a stirring container, wherein the particles comprise a starting average particle size, and stirring the fluid in the stirring container using a stirring means positioned at a predetermined stirring position within the stirring container, and during stirring:

recirculating the fluid comprising the particles by continuously retrieving an amount of fluid comprising particles from a predetermined retrieving position in the stirring container by using a retrieving means, milling the particles in the continuously retrieved fluid using a milling means, wherein during each pass through the milling means a size of particles in the retrieved fluid is reduced if the particles have a size above a predetermined particle size, and continuously reintroducing the retrieved fluid having passed through the milling means to the stirring container at a predetermined reintroduction position using a reintroduction means, wherein the reintroduced fluid comprising the particles with a reduced size is mixed with the fluid in the stirring container in a mixing region defined by the stirring means, wherein the retrieving position is determined such that the retrieved fluid comprises particles with an average particle size differing from the average particle size of particles in the fluid in the mixing region, wherein the average size of the particles is reduced in the mixing region, whereas in all other regions of the container the average particle size is only reduced very slowly together with the transport of the mixed fluid into other regions of the stirring container;

wherein the reintroduction position is provided above the stirring position, wherein the reintroduction position is provided in an upper half of the stirring container, wherein the stirring position is provided within a lower half of the stirring container and the retrieving position is provided in the upper half of the stirring container; and wherein the retrieving position and the reintroduction position are arranged near a perimeter of the stirring container on different sides.

2. The method according to claim 1, wherein the mixing region is determined as a region in an inner volume of the stirring container comprising the highest change rate of an average particle size of particles in the fluid compared with particles in the fluid in other regions of the inner volume of the stirring container.

3. The method according to claim 1, wherein the mixing region is formed around the stirring means.

4. The method according to claim 1, wherein the fluid comprises a binder and the particles comprise a colour pigment.

5. The method according to claim 1, wherein the stirring means comprise an impeller, wherein the step of stirring the fluid content of the stirring container comprises rotating the impeller.

6. The method according to claim 1, wherein the reintroduction position is provided at or near a surface of the fluid in the stirring container.

7. The method according to claim 1, wherein the method comprises determining the retrieving position by determining a retrieving region as a region within an inner volume of the stirring container, wherein the retrieving region is determined such that it comprises a highest average particle size within the stirring container compared to other regions of the stirring container, and wherein the retrieving position is provided within the determined retrieving region.

8. The method according to claim 7, wherein the mixing region and the retrieving region do not overlap.

9. The method according to claim 1, wherein the method is a control method and wherein the method comprises controlling a recirculation rate based on the average particle size in the retrieved fluid.

10. The method according to claim 9, wherein the method comprises decreasing the recirculation rate if the average particle size in the retrieved fluid is lower than a predetermined first threshold and/or if a difference between the average particle size in the retrieved fluid and the average particle size in the mixing region is lower than a predetermined second threshold.

11. A system for recirculating and milling particles in a fluid, the system comprising:

a stirring container adapted to hold the fluid comprising the particles, a stirring means for stirring the fluid in the stirring container, wherein the stirring means is positioned at a predetermined stirring position within the stirring container, and a recirculating means comprising:

a retrieving means adapted to continuously retrieve an amount of fluid comprising particles from a predetermined retrieving position in the stirring container, a milling means adapted to mill the particles in the continuously retrieved fluid, wherein during each pass through the milling means a size of the particles in the retrieved fluid is reduced if the particles have a size above a predetermined particle size, and a reintroduction means adapted to continuously reintroduce the retrieved fluid having passed through the milling means to the stirring container at a predetermined reintroduction position, wherein the stirring means define a mixing region in the stirring container in which the reintroduced fluid comprising the particles with a reduced size is mixed with the fluid in the stirring container, wherein the retrieving position is provided such that the retrieved fluid comprises particles with an average particle size differing from the average particle size of particles in the fluid in the mixing region, wherein the average size of the particles is reduced in the mixing region, whereas in all other regions of the container the average particle size is only reduced very slowly together with the transport of the mixed fluid into other regions of the stirring container;

wherein the reintroduction position is provided above the stirring position, wherein the reintroduction position is provided in an upper half of the stirring container, wherein the stirring position is provided within a lower half of the stirring container and the retrieving position is provided in the upper half of the stirring container; and wherein the retrieving position and the reintroduction position are arranged near a perimeter of the stirring container on different sides.

* * * * *